United States Patent [19]
Maire et al.

[11] 4,133,369
[45] Jan. 9, 1979

[54] FLUID TREATMENT MODULES

[75] Inventors: Jacques Maire, Epinay sur Seine; Robert Gremion, Saint Leu-la-Foret, both of France

[73] Assignee: Le Carbone-Corrane, Paris, France

[21] Appl. No.: 885,330

[22] Filed: Mar. 10, 1978

Related U.S. Application Data

[63] Continuation-in-part of Ser. No. 553,899, Feb. 27, 1975, Pat. No. 4,078,294.

[30] Foreign Application Priority Data

Mar. 1, 1974 [FR] France ................................ 74 07016

[51] Int. Cl.2 ........................ B29C 1/08; B29C 13/00; B22D 23/00

[52] U.S. Cl. ....................................... 164/46; 164/132; 249/62; 264/221; 264/317; 427/253

[58] Field of Search ............... 264/219, 221, 317, 294; 164/34–36, 46, 132, 137; 204/9, 11; 29/455, 460, 423, 428; 249/61, 62; 427/250, 253

[56] References Cited

U.S. PATENT DOCUMENTS

| | | | |
|---|---|---|---|
| 2,255,546 | 9/1941 | Hansen | 249/126 |
| 2,368,295 | 1/1945 | Goran | 164/109 |
| 2,607,969 | 8/1952 | Evans et al. | 249/161 |
| 2,725,611 | 12/1955 | Wissinger | 249/126 |
| 2,840,353 | 6/1958 | Musprett | 249/62 |
| 2,887,745 | 5/1959 | Bright | 249/62 |
| 3,234,640 | 2/1966 | Lewis | 29/416 |
| 3,608,048 | 9/1971 | Phillips | 249/62 |

*Primary Examiner*—W. E. Hoag
*Attorney, Agent, or Firm*—Brisebois & Kruger

[57] ABSTRACT

This invention relates to the making of negatives intended for the production of bodies which contain cavities of predetermined shapes.

The term "negative" signifies a disposable core member, for example as used in some molding techniques such as the lost wax process. The negative at least partly matches the cavities which latter form two independent systems of regularly distributed intersecting channels with the channels in any one same system intercommunicating via ducts which are themselves regularly distributed.

The method according to the invention consists in stacking plates which are made of an easily disposable substance and are perforated with regularly distributed holes which leave between them continuous bands of said substance the intersections of which form nodes and the width of which is less than the maximum dimension of the holes; this stacking operation is effected in such a way that holes correspond with holes and nodes with nodes, and the plates are spaced apart from one another by spacers which are also made of an easily disposable substance and whose maximum cross-sectional area is the same as that of said nodes and which are positioned over each of said nodes.

The invention also extends to the negatives whenever made by the method.

8 Claims, 7 Drawing Figures

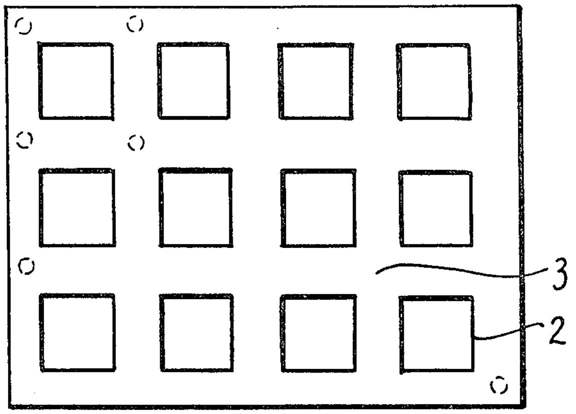
Fig.1
Fig.2
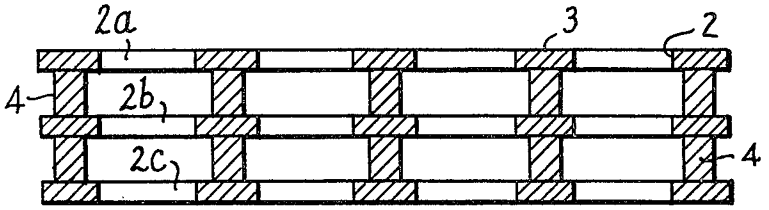
Fig.3
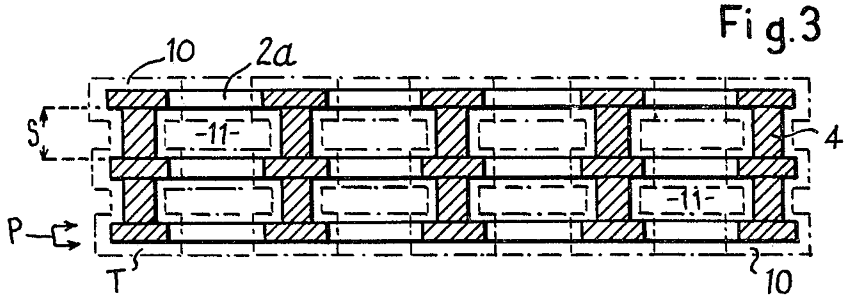
Fig.4
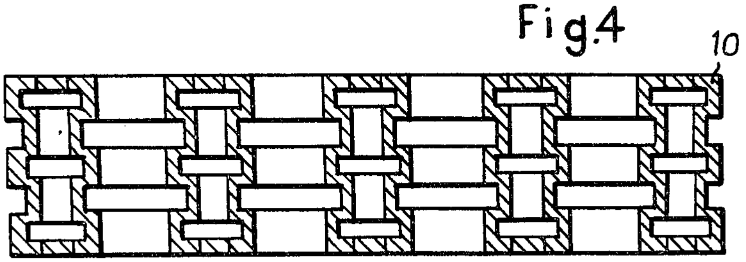

FLUID TREATMENT MODULES

This is a continuation-in-part of our application Ser. No. 553,899, filed Feb. 27, 1975, now U.S. Pat. No. 4,078,294.

BACKGROUND OF THE INVENTION

The present invention relates to methods for making negatives which are intended for the production of bodies which contain cavities of predetermined shapes. The term "negative" as used herein, therefore signifies a disposable core member for example as used in some molding techniques.

When manufacturing such a body it is in fact a widespread practice to make a negative from an easily disposable substance which negative wholly or partly matches the cavities which it is desired to form; to then wholly or partly fill the empty spaces left in the negative with the material of which the body will finally be composed; and then to dispose of the negative.

One of the best known methods of producing such bodies is the lost-wax casting method.

The shape of the negatives will obviously depend on the shape of the cavities which it is desired to form.

A primary object of the invention is to produce negatives the structure of which makes it possible to obtain bodies that include cavities which form two independent systems of regularly distributed intersecting channels with the channels in any one system intercommunicating via ducts which are themselves regularly distributed. It is for example possible to have intersecting channels which are flat and horizontal connecting ducts which are cylindrical or polygonal and vertical. In what follows such bodies will be referred to as "modules" and may be used in the field of heat-exchanging and also in the field of filtration.

Another object of the invention is to allow the techniques of producing the negatives to be adapted to the various methods of producing the module proper, namely by applying the material of which the module is made to the negative.

SUMMARY OF THE INVENTION

A technique according to the invention for making such negatives consists in stacking up plates made of an easily disposable substance which plates are perforated with regularly spaced holes which leave between them continuous bands of the substance. The intersections of the bands form nodes and the width of the bands is less than the maximum dimension of the holes. The plates are so stacked that holes match with holes and nodes with nodes and they are spaced apart by means of spacers the maximum cross-sectional area of which is the same as that of the nodes and which are positioned over each of the nodes and the height of which is greater than the thickness of the plates.

This technique is particularly suitable where the material forming the module is then applied to the negative in layers the thickness of which is such that the height of the spacers is equal to the thickness of one plate plus twice the thickness of the applied layer. In effect, in this case, after the said material has been applied (and after any treatment which may be needed to make it cohere) and the negative has been disposed of, a module is obtained in which one of the two independent systems of channels and their corresponding ducts is formed by a proportion of the empty space in the negative, the second system being formed by the voids left by the negative (namely the plates and spacers) when it is removed.

The number of plates and their dimensions, the size, number and distribution of the holes, and the size and number of the spacers depend on the dimensions of the module which it is desired to obtain and on the dimensions, number and geometry of the channels and ducts which it is to contain.

The holes may be of any cross-sectional shape whatever; round, square, etc. Similarly in the case of the spacers, which may be parallelpiped, cylindrical etc.

The continuous bands of substance separating the holes may intersect at any angle whatever.

The nature of the substances of which the negative (plates and spacers) is formed depend principally on the nature of the material from which the module will be formed, these substances and this material needing to be compatible in the circumstances under which the module proper is produced, and the substances of which the negative is made needing to be capable of being easily removed without damage to the material of which the module is made.

BRIEF DESCRIPTION OF THE DRAWINGS

In order that the invention may be more clearly understood, reference will now be made to the accompanying drawings, which show some embodiments thereof by way of example, and in which:

FIG. 1 is a diagram showing a perforated plate with holes separated by nodes,

FIG. 2 shows diagrammatically a side elevation of a stack plates, plates.

FIG. 3 shows the same view as FIG. 2 with the material from which the module is to be formed applied around the stacked plates, FIG. 4 shows the module after the plates and spacers have been removed.

SPECIFIC DESCRIPTION OF PREFERRED EMBODIMENTS

Figure 5:
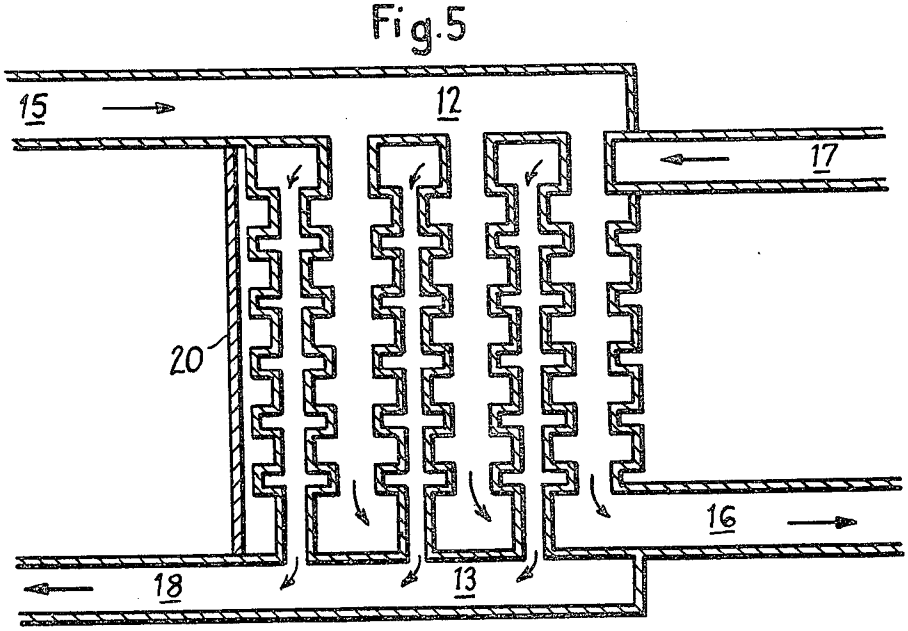
FIG. 5 shows a section through an embodiment of a heat exchanger module.

Referring now to the drawings, FIG. 1 represents a plate showing square-shaped holes 2 separated by nodes 3.

In FIG. 2 three plates are shown stacked one above the other with the centres of the holes *2a*, coinciding with the centres of the corresponding holes *2b* and *2c* of the other plates.

Between the nodes of each pair of adjacent plates are positioned spacers 4 which hold the two plates apart.

With regard to the materials from which the spacers and plates are formed it may simply be pointed out that where the material from which the module is eventually formed is dense, the spacers may be made of the same substance as the plates and that where the module material is compressible and needs to be compressed before the negative is removed, the spacers need to be of a substance which is more compressible than the material of the module.

It may be pointed out that in cases where the material of the module is dense, the stack of plates needs to be held together under light pressure so that no material can penetrate along the points of contact between the spacers and nodes.

Materials which may be used for the initial negative and for the manufacture of the module may be as follows. Thus the plates and spacers may be made from aluminium when the resulting module is to be made from nickel. Alternative materials are carbon for the plates and spacers and titanium, tantalum or molybdenum for the module. In the latter case, any of the three metals may be deposited on the negative from their volatile halides.

With all the stacked systems described above the perforated plates and their spacers may be stacked manually or with suitable equipment. In this case it is essential for them to be placed in a mould the cross-section of which is of identical dimensions to the plates. It will be appreciated that far more plates may be stacked than is actually shown in FIG. 2.

Once the plates have been stacked on the spacers to form the stack shown in FIG. 2 the plates and spacers are then covered in a suitable manner by a layer of the material from which the eventual module is to be formed.

This is shown in FIG. 3 where the layer is indicated at 10. Preferably the thickness T of this layer such that the height S of a spacer is equal to the thickness P of one plate plus twice the thickness of the applied layer so that $S = P + 2T$. It will thus be appreciated that the application of the layer still leaves voids in the system formed by the stacked plates, spacers and layer and that, the void 11 has a height which is equal to the thickness of a perforated plate.

The next step of the process is the removal of the disposable substance from within the applied layer so as to leave the module proper. The module so produced is shown in FIG. 4. It will be appreciated that the dimensions shown in FIGS. 1 to 4 are not to scale and are purely diagrammatic. the dimensions of the module and its walls may vary considerably.

However, it will be appreciated that this module once incorporated in a casing 20 as shown in FIG. 5 and provided with suitable header channels 12 and 13 will provide two separate systems through which fluids or gases may flow without coming into contact with one another, one system having an inlet 15 and an outlet 16, and the other having an inlet 17 and an outlet 18.

Figure 6:
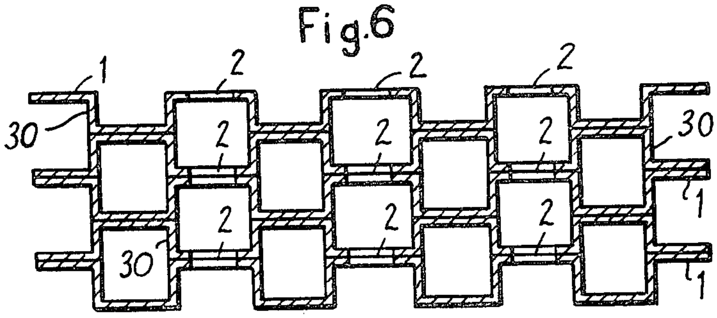
FIG. 6 is a diagrammatic view similar to FIG. 2 showing one alternative embodiment of a module.

An alternative of a negative consisting of stacked, perforated plates which is more economical in that it avoids the use of separate spacers is shown in FIG. 6. In this embodiment each plate is recessed at its nodes to form reliefs 30. The recesses may be of a cylindrical, parallelepiped or other suitable shape. Furthermore each single plate of the embodiment of FIGS. 1 to 4 is replaced by a pair of plates, with the holes 2 in the pair of plates matching, and the reliefs or bosses 30 projecting in opposite directions so that each relief 30 forms half a spacing means.

Figure 7:
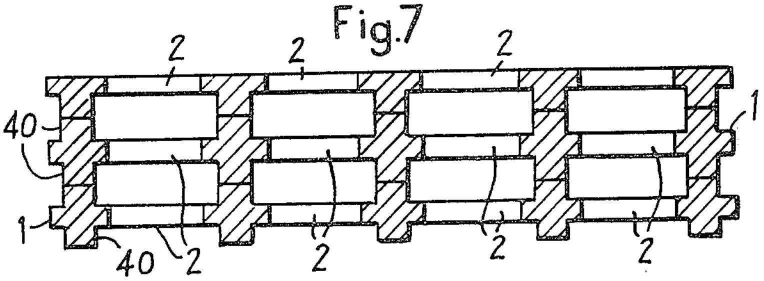
FIG. 7 is a similar view of yet another alternative.

This embodiment is further simplified in the embodiment shown in FIG. 7. In this embodiment each pair of back-to-back plates is replaced by a single plate having symmetrical reliefs or bosses 40 extending from either side thereof.

Finally, a few remarks may be made which apply to all the embodiments described:

the plates employed may contain small holes which, when the module proper is made, allow bridges of material to be created between the walls which separate the various channels in the module, these bridges endowing the module with greater strength and being capable of creating turbulence in the fluids which flow through the channels, which they will do to a greater extent the more carefully the holes in the plates are distributed and their cross-sections calculated.

from negatives produced with these techniques it is possible to obtain modules.

With the technique described the separating walls may be very thin, of the order of 1mm to 1/100mm or less, the cross-section of the channels in which may be 1mm to 1/100mm or less, in which the flow length for the fluids may be 1/10mm to 1cm and above.

We claim:

1. A method of making a negative intended for the production of bodies containing cavities of predetermined shape, said negative at least partly matching said cavities, and said cavities forming two independent systems of regularly distributed channels with the channels of one system intercommunicating via ducts which are themselves regularly distributed, said method consisting of stacking plates which are made of an easily disposable substance and which are perforated with regularly distributed holes which leave between them continuous bands of said substance the intersections of which form nodes and the width of which is less than the maximum diameter of the holes, said plates being spaced apart by spacer means which are also made for an easily removable substance and wherein the plates are stacked with each perforation of a plate in alignment with the corresponding perforations in the other plates, and each spacer means extending between two nodes of adjacent plates, forming a layer over the stacked plates and spacer means so as to partially fill the voids between the plates and the perforations in the plates, and removing said plates.

2. A method as claimed in claim 1, wherein each spacer means has a maximum cross-sectional area which is not greater than the area of a node.

3. A method as claimed in claim 1, wherein the height of a spacer means is equal to the thickness of one plate plus twice the thickness of the applied layer.

4. A method as claimed in claim 1 wherein the spacer means comprise reliefs extending from the nodes of the plates.

5. A method as claimed in claim 4, wherein the reliefs of one plate all project in the same direction, the plates being arranged in pairs with the reliefs thereof projecting in opposite directions, each relief defining one half of a spacing means.

6. A method as claimed in claim 4, wherein the reliefs on each plate extend symmetrically on either side thereof, each relief providing one half of a spacing means.

7. A process of manufacturing a module comprising the steps of:

(a) providing a plurality of similar plates made from an easily disposable substance and which are perforated with regularly distributed holes which leave between them continuous bands of said substance the intersection of which form nodes, (b) stacking the plates in parallel layers with corresponding perforations in the plates aligned with one another, the plates being held in spaced relationship by spacing means which are also of an easily disposable substance, each spacing means extending between two nodes of consecutive plates, (c) forming a layer of the material from which the module is to be formed over the assembly of stacked plates and spacers so as partially to fill in the voids between the plates and the perforations in the plates, and (d) removing the plates and spacing means from within the applied layer so as to create a system of interconnecting channels and ducts within the material of the layer through which a fluid may flow.

8. A method according to claim 7 wherein said step of forming a layer comprises depositing metal on said plates from a volatile halide of said metal.

* * * * *

UNITED STATES PATENT OFFICE

CERTIFICATE OF CORRECTION

Patent No. 4,133,369 Dated January 9, 1979

Inventor(s) JACQUES MAIRE and ROBERT GREMION

It is certified that error appears in the above-identified patent and that said Letters Patent are hereby corrected as shown below:

[73] Assignee: LE CARBONE-LORRAINE, Paris, France

Signed and Sealed this

*First* Day of *May 1979*

[SEAL]

*Attest:*

RUTH C. MASON
*Attesting Officer*

DONALD W. BANNER
*Commissioner of Patents and Trademarks*